United States Patent [19]

Leclercq et al.

[11] 4,386,060
[45] May 31, 1983

[54] PROCESS FOR THE PREPARATION OF SULFAMIC ACID

[75] Inventors: Philippe Leclercq, Lille; Jacques Luternauer, Bondues, both of France

[73] Assignee: Produits Chimiques Ugine Kuhlmann, Courbevoie, France

[21] Appl. No.: 343,831

[22] Filed: Jan. 29, 1982

[30] Foreign Application Priority Data

Jan. 30, 1981 [FR] France .................................. 81 01786

[51] Int. Cl.$^3$ .............................................. C01B 17/00
[52] U.S. Cl. ...................................................... 423/389
[58] Field of Search ............................................ 423/389

[56] References Cited

U.S. PATENT DOCUMENTS

| | | | |
|---|---|---|---|
| 2,109,952 | 3/1938 | Wyler | 423/389 |
| 2,408,492 | 10/1946 | Tauch | 423/389 |
| 2,408,823 | 10/1946 | Tauch | 423/389 |
| 2,419,618 | 4/1947 | Wilson | 423/389 |
| 2,436,658 | 2/1948 | McQuaid | 423/389 |
| 2,851,336 | 9/1958 | Tauch | 423/389 |
| 3,051,551 | 8/1962 | Ferlin et al. | 423/389 |
| 3,125,415 | 3/1964 | Gilbert et al. | 423/389 |
| 3,127,240 | 3/1964 | Gilbert et al. | 423/389 |
| 3,188,175 | 6/1965 | Nychka | 423/389 |
| 3,423,174 | 1/1969 | Sowerby | 423/389 |

FOREIGN PATENT DOCUMENTS

| | | | |
|---|---|---|---|
| 91115 | 6/1961 | Denmark | 423/389 |
| 39-212 | 1/1964 | Japan | 423/389 |
| 97962 | 5/1961 | Norway | 423/389 |

*Primary Examiner*—O. R. Vertiz
*Assistant Examiner*—Wayne A. Langel
*Attorney, Agent, or Firm*—Brooks, Haidt, Haffner & Delahunty

[57] ABSTRACT

Processes for the production of sulfamic acid by the reaction of urea, sulfuric anhydride, and sulfuric acid in (1) a two-stage process wherein the sulfuric anhydride used in the first stage at a temperature less than 50° C. is dissolved in a halogenated fluorocarbon or a mixture of halogenated fluorocarbons having a boiling point of from 0° to 50° C. or (2) in a one-stage process at 60° to 100° C. with the sulfuric anhydride dissolved in a halogenated fluorocarbon or a mixture of halogenated fluorocarbons having a boiling point below 100° C. at atmospheric pressure, the halogenated fluorocarbon serving to remove the heat generated by the exothermic formation of the sulfamic acid from the original reactants.

12 Claims, 2 Drawing Figures

PROCESS FOR THE PREPARATION OF SULFAMIC ACID

BACKGROUND OF THE INVENTION

This invention relates to a process for the preparation of sulfamic acid by reacting urea, sulfuric acid, and sulfuric anhydride, and more particularly, it relates to processes for preparing sulfamic acid with effective means for dealing with the heat released in such processes.

There are two main methods of preparing sulfamic acid, $HSO_3NH_2$, namely, the direct reaction of anhydrous ammonia with sulfuric anhydride, and the reaction of urea with sulfuric acid and sulfuric anhydride.

In the first method, the reaction between $SO_3$ and $NH_3$ results, in a first stage, in the formation of ammonium sulfamino salts which have to be acidified and hydrolyzed with sulfuric acid in a second stage, thus leading to the formation of sulfamic acid and a greater or smaller quantity of ammonium hydrogen sulfate, known as ammonium bisulfate, which is separated by crystallization and filtration in the form of ammonium sulfate, after neutralization of the mother liquors of crystallization of the sulfamic acid. This type of process has the disadvantage of leading to the formation of at best one molecule of ammonium hydrogen sulfate per molecule of sulfamic acid formed, the under-production often being much greater in practice.

In the second method, the sulfamic acid is formed from sulfuric acid, sulfuric anhydride, and urea according to the general reaction scheme (I):

$$H_2SO_4 + SO_3 + CO(NH_2)_2 \rightarrow 2\ HSO_3NH_2 + CO_2 \qquad (I)$$

which has the theoretical advantage of not resulting in the formation of ammonium hydrogen sulfate.

In a first embodiment of this latter process, the urea is reacted with a substantial excess of sulfuric acid and anhydride, these two reactants being added either separately or in the form of mixtures of oleum and sulfuric acid. In this way, a suspension of sulfamic acid in a weak oleum or in sulfuric acid is obtained. To separate the sulfamic acid, it is necessary to perform filtration and washing of the cakes obtained with increasingly dilute sulfuric liquors. These filtering and washing operations are difficult to carry out and require a great deal of expensive apparatus. Moreover, the washing operations always cause partial hydrolysis of the sulfamic acid, leading to a loss of this product in the form of ammonium hydrogen sulfate.

In another process for the preparation of sulfamic acid from urea, in a first stage the sulfuric acid and urea are reacted in stoichiometric proportions with a quantity of sulfuric anhydride which may be in excess at a temperature below 50° C., then in a second phase the liquid complex formed is decomposed at a temperature of 60° C. to 100° C., while the excess $SO_3$ and the $CO_2$ formed are entrained by means of an inert gas. It has been proposed to effect this decomposition in the presence of a third substance which may be, for example, recycled sulfamic acid in a quantity sufficient to ensure that the mass retains the appearance of a dry product, or an inert liquid compound immiscible with $HSO_3NH_2$, such as tetrachloroethane, $C_2H_2Cl_4$, or sulfuric chlorohydrin, $HSO_3Cl$. The decomposition is then carried out in a reactor with vigorous agitation, so as to break the sulfamic acid into small granules. One of the difficulties of this technique, which is otherwise useful, is the elimination of the heat released by the reaction (I) for forming the complex, since the very viscous liquid obtained has to be conveyed to a heat exchanger outside the reactor.

THE INVENTION

The present invention involves an improved process for producing sulfamic acid by the urea route, which process solves the problem of the released heat of reaction. Briefly, the present invention dissolves the sulfur trioxide used in the first stage of the process for preparing sulfamic acid by reacting sulfur trioxide, sulfamic acid, and urea in a halogenated fluorocarbon or a mixture of halogenated fluorocarbons having a boiling point of from 0° to 50° C. for a two-stage process or having a boiling point below 100° C. at atmospheric pressure for a one-stage process.

The invention is further described by reference to the accompanying drawings, wherein.

Figure 1:
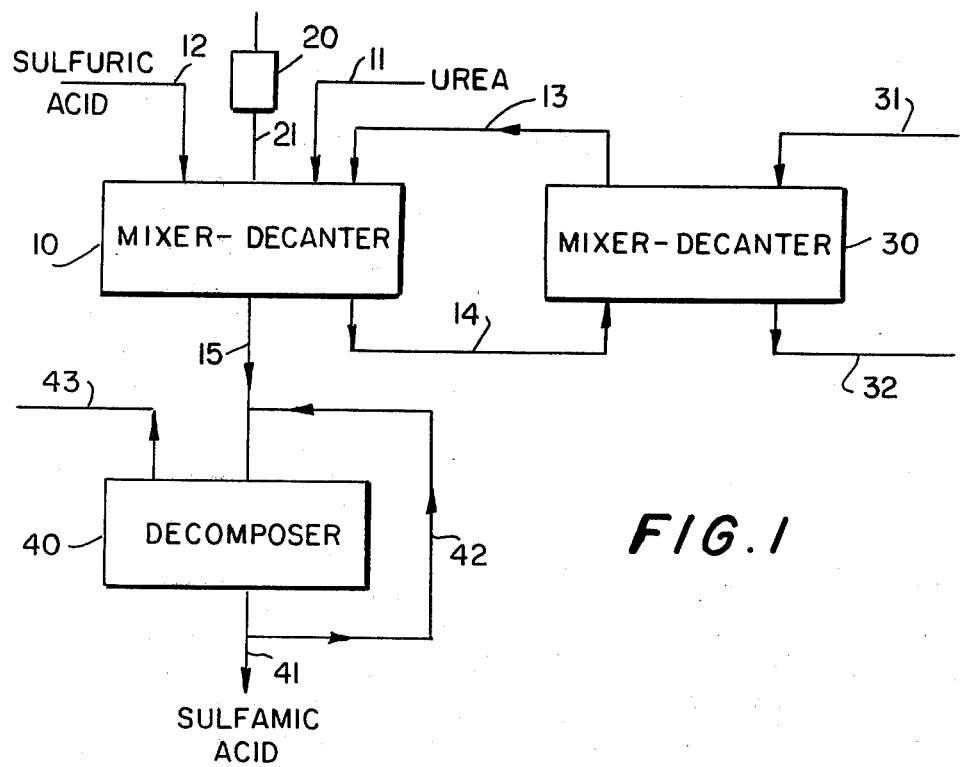
FIG. 1 is a schematic of a continuous process.

The sulfuric acid, the urea, and the $SO_3$, previously dissolved in the halogenated fluorocarbon, are simultaneously introduced into a reactor fitted with an efficient stirring system, and the reaction temperature is thus maintained constant at the boiling temperature of the fluorocarbon as a result of the partial boiling of the latter under the effect of the exotherm of the reaction.

The vaporized fluorocarbon is condensed and reintroduced into the reactor after a further quantity of $SO_3$ has been redissolved. The complex so formed, which is immiscible with the fluorocarbon, is separated from the latter by liquid-liquid decantation, together with the traces of sulfamic acid formed at this stage, and the whole is passed into a decomposer where the second stage of the reaction, that is, decomposition of the complex, is carried out at a temperature maintained between about 60° C. and about 100° C. by suitable means.

For the reasons previously mentioned, the decomposition of the complex is advantageously carried out in the presence of recycled granulated sulfamic acid. It is particularly appropriate to use liquid sulfuric anhydride, which is easily dissolved in the halogenated fluorocarbon, but it is also possible to use synthesis gases containing from 10 to 12% of $SO_3$ and in this case it is preferable to work under pressure in order to increase the solubilization of the $SO_3$ and reduce the entrainment of the halogenated fluorocarbon.

Another embodiment according to the present invention consists in simultaneously carrying out the reactions of forming the complex and decomposing it into sulfamic acid in the presence of a halogenated fluorocarbon, the boiling temperature of which is higher, being from about 60° to about 100° C., or of a mixture of halogenated fluorocarbons with a boiling point of from about 60° to about 100° C.

The sulfuric acid, urea and $SO_3$, previously dissolved in the halogenated fluorocarbon, are simultaneously introduced into a reactor fitted with an efficient stirring system and previously partly charged with halogenated fluorocarbon. The reaction temperature is again kept constant at the boiling temperature of the fluorocarbon, as a result of the partial boiling of the latter under the effect of the exothermic nature of the reaction. The vaporized fluorocarbon is condensed and reintroduced into the reactor.

A suspension of small beads of sulfamic acid, immiscible with the fluorocarbon, is obtained directly. Any suitable means can be used to separate the sulfamic acid, which is recovered, from the halogenated fluorocarbon which is reintroduced into the reactor after a new quantity of $SO_3$ has been redissolved.

Any halogenated fluorocarbons or mixtures of halogenated fluorocarbons with a boiling point of less than 100° C. at atmospheric pressure can be used in the processes according to the present invention, since these products have excellent chemical stability with respect to $SO_3$. The working pressure should be chosen as a function of the boiling point, so that the vaporization temperature of the halogenated fluorocarbon or mixture of halogenated fluorocarbons is equal to the working temperature selected. In other words, the reaction will be carried out at atmospheric pressure for a boiling point of from 60° to 100° C., and at a pressure above atmospheric pressure for a boiling point below 60° C.

Trifluorotrichloroethane, $CFCl_2$—$CF_2Cl$, marketed by Produits Chimiques Ugine Kuhlmann under the trademark Forane 113, is particularly suitable in view of its boiling temperature of 47.6° C. at 760 mm Hg. Monofluorotrichloromethane, Forane 11, and difluorotetrachloroethane, Forane 112, having boiling temperatures of 23.8° C. and 92.7° C., respectively, under 760 mm Hg, and mixtures of two of these three products in suitable proportions are also desirably used.

When the process is carried out discontinuously, it is generally preferable to prepare the solution of $SO_3$ in the halogenated fluorocarbon beforehand. It is also possible to introduce into the starting reactor the sulfuric acid and the urea, and then a solution of $SO_3$ in the halogenated fluorocarbon. On the other hand, when the process is carried out continuously, it is preferable to introduce the $SO_3$ and the halogenated fluorocarbon separately, along with the urea and the sulfuric acid, into the reactor used. The $SO_3$ dissolves immediately in the halogenated fluorocarbon, whereas the urea, the sulfuric acid, and the complex formed are not soluble in this fluorocarbon.

The $SO_3$ is, in practice, soluble in any proportions in the halogenated fluorocarbon, and therefore the dissolution of the $SO_3$ does not present any particular problems. Nevertheless, it has been found advisable to use solutions containing 10 to 30% by weight of $SO_3$ in the fluorocarbon or fluorocarbons, thus always ensuring that the other reagents are dispersed in the solution of $SO_3$ in the fluorocarbon.

When the sulfuric anhydride used contains impurities such as stabilizers, it is advisable to put the $SO_3$ into solution in the halogenated fluorocarbon beforehand, as it is then easy to separate these impurities, which are insoluble in the fluorocarbon and can therefore be separated by a simple liquid-liquid decantation.

The invention will now further be described with reference to the accompanying FIGS. 1 and 2.

FIG. 1 shows a continuous embodiment of the process, with which particularly high yields of sulfamic acid have been obtained.

The urea and sulfuric acid are introduced through conduits 11 and 12, respectively, into mixer-decanter 10 provided with a condenser 20 communicating therewith via conduit 21. Through line 13 there is also introduced into mixer-decanter 10 a solution of $SO_3$ in the halogenated fluorocarbon, with a boiling temperature of between 0° and 50° C., prepared in mixer-decanter 30 into which the liquid $SO_3$ is introduced via line 31, the insoluble residues from mixer-decanter 30 being removed through conduit 32, while the fluorocarbon decanted in mixer-decanter 10 arrives at mixer-decanter 30 through conduit 14. The complex formed in mixer-decanter 10 at the boiling temperature of the fluorocarbon is transferred through line 15 to decomposer 40, which is maintained at a temperature of from 60° C. to 100° C. by any suitable means.

Some of the sulfamic acid obtained is recycled through conduit 42 into decomposer 40, while the sulfamic acid obtained is drawn off through line 41. The $CO_2$ formed during decomposition of the complex is removed via line 43.

Figure 2:
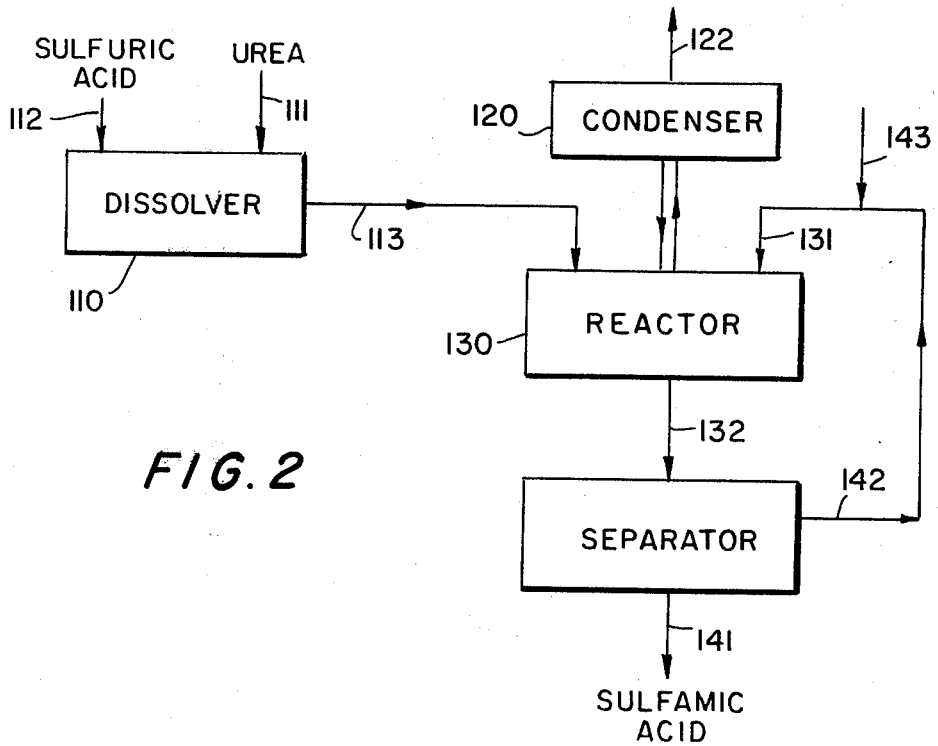
FIG. 2 is a schematic of a continuous single-stage complex-forming/decomposition embodiment.

FIG. 2 shows another continuous embodiment of the process wherein the reactions for formation of the complex and the decomposition thereof into sulfamic acid are carried out in a single stage.

The urea and the sulfuric acid are introduced into dissolver 110 through conduits 111 and 112, respectively. The resultant liquid urea sulfate is passed through line 113 into reactor 130 fitted with condenser 120. At the same time, a solution of $SO_3$ dissolved in halogenated fluorocarbon is introduced into reactor 130 through conduit 131.

In reactor 130, the halogenated fluorocarbon is heated to boiling and brought to the working pressure selected. The $CO_2$ given off by the reaction passes via line 121 through condenser 120 and is removed at line 122. The suspension of sulfamic acid in the fluorocarbon leaves reactor 130 through conduit 132 and is passed into separator 140. The sulfamic acid is collected via conduit 141, and the halogenated fluorocarbon is removed through line 142. Some $SO_3$ introduced through conduit 143 is added to the halogenated fluorocarbon withdrawn through line 142 to be passed to reactor 130 through line 131.

All parts, percentages, proportions and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

A reactor surmounted by a cooler and fitted with an efficient cooling system is charged with 167.7 parts by weight of 100% sulfuric acid and 352 parts of trichlorotrifluoroethane. Then a stoichiometric quantity of urea, that is, 100.8 parts of industrial grade product, is added progressively at a temperature of 35° C. during one and one-half hours.

To the suspension of urea sulfate in the fluorocarbon, there is then added, over a period of 45 minutes, 193.9 parts of $SO_3$ as a 42.2% solution in trichlorotrifluoroethane. Thus, a 40% excess of $SO_3$ compared with the stoichiometric amount is added.

The temperature rises to 47°–48° C., the boiling temperature of the fluorocarbon. The complex formed between the three reagents, which is a liquid insoluble in the trichlorotrifluoroethane, is separated therefrom by decanting. By heating to 85° C., this complex is decomposed until all the $CO_2$ and the excess $SO_3$ have been given off, and 314.6 parts of a product are obtained. This product contains 96.2% of sulfamic acid, corresponding to a production of crude sulfamic acid in a 93% yield.

EXAMPLE II

Proceeding as in Example I, first the urea sulfate is prepared, using 67.5 parts of 100% $H_2SO_4$ and 41.4 parts of urea in the presence of 307 parts of trichlorotrifluoroethane during one hour at 35° C. Then, 56.2 parts of $SO_3$ are added, that is, an excess of not more than 2% compared with the stoichiometric amount, using a 19% solution in trichlorotrifluoroethane, over a period of 30 minutes, at a temperature of 47°–48° C.

After decanting, almost all the trichlorotrifluoroethane is taken out and replaced by 490 parts of tetrachlorodifluoroethane. The boiling temperature of the mixture of fluorocarbons is thus about 85° C., at which temperature decomposition of the complex is effected until all the $CO_2$ and the last traces of $SO_3$ have been given off.

The sulfamic acid formed appears in the form of small beads which are very easily decanted, and is very easily separated from the mixture of fluorocarbons. In this way, 135.3 parts of a product are obtained, with an average purity of sulfamic acid of 93.3%, corresponding to a production yield of 94.1%.

EXAMPLE III

A reactor similar to that in Example I is successively charged with 251 parts of tetrachlorofluoroethane containing 105 parts of $SO_3$ and 99.2 parts of 100% sulfuric acid. With the reactor initially brought to 75° C. and with the stirrer in operation, the urea is added progressively so as to stay within the operational limits of the cooler. As the $SO_3$ is used up, the temperature rises progressively to 85° C.

The amount of urea added is 60.7 parts, added over 20 minutes, while the excess of $SO_3$ remaining, compared with the stoichiometric amount, is 31.25%. The sulfamic acid appears in the form of small beads 15 minutes after the start of addition of the urea, and the temperature is still kept at 85° C. for 20 minutes after the addition of all the urea, to ensure that all the $CO_2$ has been given off.

After cooling and separation, 198 parts of a product are obtained containing 92.7% of sulfamic acid, corresponding to a production yield of 93.6%.

EXAMPLE IV

To a reactor containing, at the base of the tank, a suspension made up of 6,444 parts by weight of trifluorotrichloroethane and 1875 parts of sulfamic acid from an earlier operation, having the following composition by weight:

| | |
|---|---|
| $HSO_3NH_2$ | 92.92% |
| Ammonium bisulfate | 2.8% |
| Urea | 0.34% |
| $SO_3$ | 3.94% | there are added 700 parts per hour of liquid urea sulfate formed by dissolving 300 parts per hour of urea in 400 parts per hour of 95% sulfuric acid. Further, 2896.5 parts per hour of a 20.37% solution of $SO_3$ in trifluorotrichloroethane is introduced. The temperature is maintained at between 72° and 74° C. and the pressure is 2.4–2.6 bars, absolute.

A suspension of sulfamic acid in trifluorotrichloroethane is drawn off from the reactor. After separation, sulfamic acid is obtained containing, on average, 91.6% of sulfamic acid, 2.1% of ammonium bisulfate, 6% of $SO_3$, and 0.3% of urea.

The production yield of sulfamic acid relative to the urea fed is 97%, on average, and 98% relative to the urea reacted.

What is claimed is:

1. A process for the production of sulfamic acid by reacting urea, sulfuric anhydride, and sulfuric acid wherein the sulfuric anhydride fed to the process is dissolved in a halogenated fluorocarbon or a mixture of halogenated fluorocarbons, the fluorocarbon or fluorocarbon mixture having a boiling point of from 0° C. to less than 100° C.

2. A process according to claim 1 carried out in two stages, a first cold stage at a temperature less than 50° C. and a second hot stage carried out at a temperature of from about 60° to about 100° C., the sulfuric anhydride fed to the first stage being dissolved in a halogenated fluorocarbon or a mixture of halogenated fluorocarbons, the boiling point of the fluorocarbon or of the fluorocarbon mixture being from 0° to 50° C.

3. A process according to claim 1 carried out in a single stage at a temperature of from 60° to 100° C., the sulfuric anhydride fed being dissolved in a halogenated fluorocarbon or a mixture of halogenated fluorocarbons, the fluorocarbon or fluorocarbon mixture having a boiling point at atmospheric pressure of less than 100° C., and the reaction being carried out under atmospheric pressure when the boiling point of the fluorocarbon or fluorocarbon mixture is from 60° to 100° C. and under superatmospheric pressure when the boiling point of the fluorocarbon or fluorocarbon mixture is less than 60° C.

4. A process according to claim 1, 2, or 3 wherein the solution of sulfuric anhydride in the fluorocarbon or in the fluorocarbon mixture contains from about 10 to about 30 weight percent of $SO_3$.

5. A process according to claim 1, 2, or 3 wherein the sulfuric anhydride is dissolved in the fluorocarbon prior to reaction with the urea and sulfuric acid.

6. A process according to claim 1, 2, or 3 wherein the sulfuric anhydride and the fluorocarbon are separately added to the urea and sulfuric acid.

7. A process according to claim 1, 2, or 3 wherein the fluorocarbon is halogenated with chlorine or bromine.

8. A process according to claim 1, 2, or 3 wherein the halogenated fluorocarbon is trifluorotrichloroethane.

9. A process according to claim 1, 2, or 3 wherein the halogenated fluorocarbon is fluorotrichloromethane.

10. A process according to claim 1, 2, or 3 wherein the halogenated fluorocarbon is difluorotetrachloroethane.

11. A process according to claim 1, 2, or 3 wherein the mixture of the fluorocarbons is a mixture of fluorotrichloromethane and trifluorotrichloroethane, a mixture of monofluorotrichloromethane and difluorotetrachloroethane, or a mixture of trifluorotrichloroethane and difluorotetrachloroethane.

12. A process according to claim 1, 2, or 3 wherein the fluorocarbon or fluorocarbon mixture is separated from the sulfamic acid formed and the fluorocarbon or fluorocarbon mixture is recycled to the process.

* * * * *